Apr. 3, 1923.
J. A. HAZELTON
DIFFERENTIAL GEARING
Filed Mar. 7, 1922
1,450,210
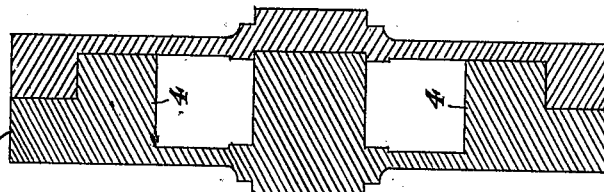
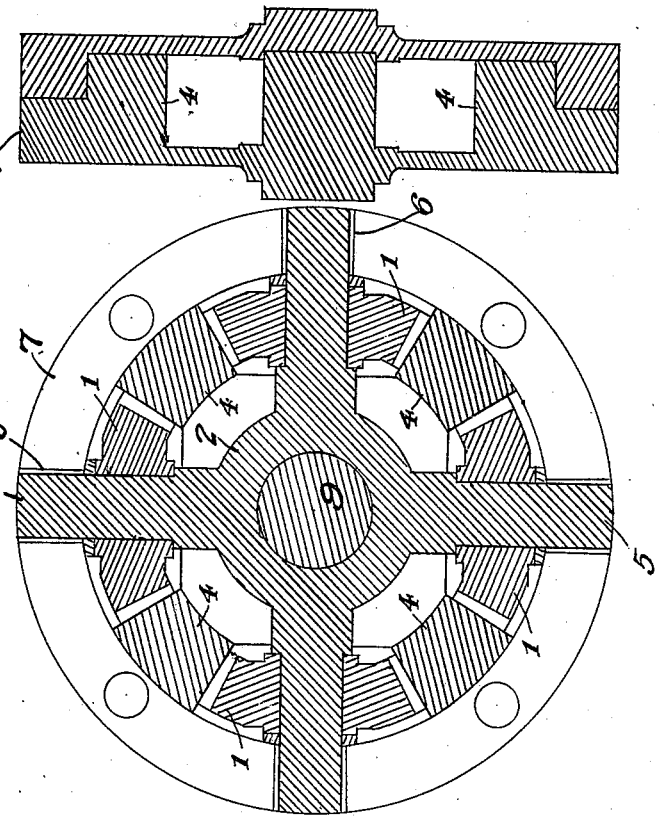
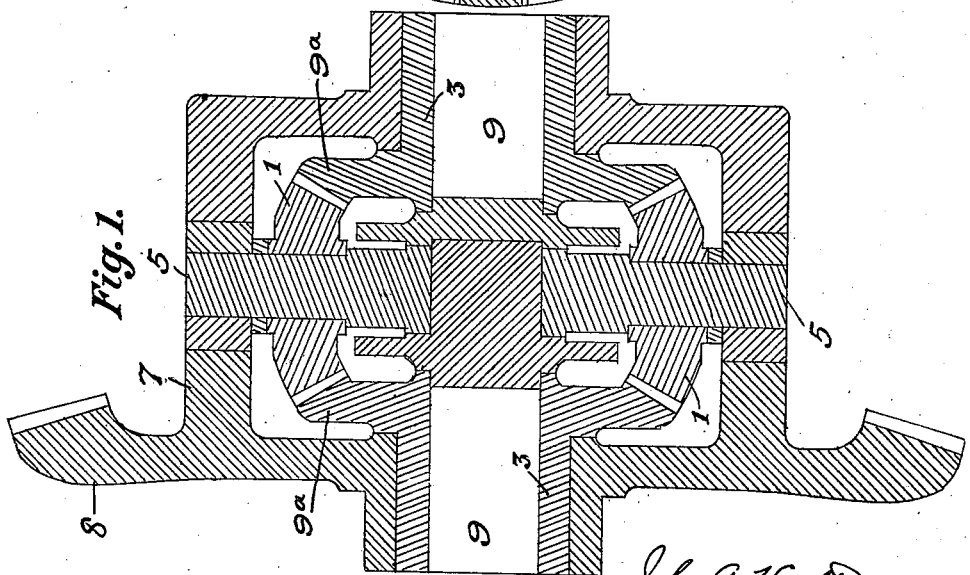
John A. Hazelton
INVENTOR.

Patented Apr. 3, 1923.

1,450,210

UNITED STATES PATENT OFFICE.

JOHN A. HAZELTON, OF BALTIMORE, MARYLAND.

DIFFERENTIAL GEARING.

Application filed March 7, 1922. Serial No. 541,713.

*To all whom it may concern:*

Be it known that I, JOHN A. HAZELTON, a citizen of the United States, residing at Baltimore, Maryland, have invented a certain new and useful Improvement in Differential Gearing, of which improvement the following is a specification.

The object of my invention is to provide an improved construction of bevel gear differential, designed to take the place of the differential now in general use in the rear axle of motor vehicles, my improvement being designed to obviate the principal objection of said ordinary differential, which is failure to comply with the requirement unless both wheels have sufficient frictional engagement with the ground, commonly known as "traction," in order to enable the car to advance. As is well known, when one of the driven wheels loses its traction, owing, for example, to its resting on a slippery surface, and the power of the motor is applied to the wheel-driving shafts through the differential, the effect is to "spin" the wheel having insufficient traction while the other wheel remains stationary, the tendency being to rotate the latter backwardly.

The improvement claimed is hereinafter fully set forth.

In the accompanying drawing: Figure 1 is a longitudinal section through my improved differential; Fig. 2, a cross section of the same; and, Fig. 3, a section through the driving casing.

The driving satellite pinions, 1, are carried on studs, 5, of the spider, 2, instead of being carried, as has heretofore been the custom, on studs secured in the driving casing. The studs 5, of the spider, engage in holes 6, in the casing, 7, with a small amount of play or lost motion, as shown. Between the faces of each adjacent pair of pinions, 1, is a driving lug, 4, integral with the casing, 7, which is driven in the usual way by the large bevel gear, 8, or in any other suitable manner. The driving lugs, 4, are tapered, as shown in Fig. 2, and have flat plane surfaces which fit between the adjacent bevel pinions, and bear against the inside edges of two adjacent teeth thereof, thus transmitting the rotation of the casing to the spider through pressure applied to the peripheries of the pinions, and, through them, to the bevel gears 9$^a$, 9$^a$, on the ends of the two wheel-driving shafts 9, 9. The spaces between any two adjacent driving lugs, 4, are just sufficient to allow the pinions, 1, to rotate, when the spider studs are in the centre of the openings in the casing, as shown in Fig. 2.

By this construction, the spinning of the wheels is prevented, for the reason that uniform driving force is maintained on all the driving pinions, under any and all conditions, while the outer wheel on a curve exerts force enough to rotate the pinions sufficiently to accommodate its greater speed, in other words, either wheel can "overrun" when necessary. To describe the result obtained in another way, I obtain a positive drive of either wheel, forward or backward, even when the other wheel has lost its traction.

I claim as my invention, and desire to secure by Letters Patent:

1. A differential gear, comprising bevel gears, secured on the ends of the halves of a divided shaft; bevel pinions meshing with said gears; a spider carrying said pinions; a driving casing, having a lost motion connection with said spider; and driving lugs, carried by said casing, and acting on the toothed faces of said pinions.

2. A differential gear, comprising a driving casing; a spider therein, capable of relative angular movement; satellite pinions, carried by said spider; wheel driving shafts; gears on the said shafts, meshing with said pinions; and lugs on the inside of the casing, fitting between each adjacent pair of pinions, and acting to transmit the power directly thereto.

JOHN A. HAZELTON.